United States Patent
Choi

(10) Patent No.: US 9,635,340 B2
(45) Date of Patent: Apr. 25, 2017

(54) STEREO IMAGE PROCESSING APPARATUS AND METHOD THEREOF

(71) Applicant: Hyundai Motor Company, Seoul (KR)

(72) Inventor: Jin Ha Choi, Seoul (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 481 days.

(21) Appl. No.: 13/954,688

(22) Filed: Jul. 30, 2013

(65) Prior Publication Data

US 2014/0285620 A1   Sep. 25, 2014

(30) Foreign Application Priority Data

Mar. 19, 2013   (KR) ........................ 10-2013-0029181

(51) Int. Cl.
*H04N 13/02* (2006.01)
*H04N 13/00* (2006.01)
*G06T 5/00* (2006.01)

(52) U.S. Cl.
CPC ......... *H04N 13/0025* (2013.01); *G06T 5/008* (2013.01); *H04N 13/025* (2013.01);
(Continued)

(58) Field of Classification Search
CPC ........... G06K 9/00798; G06K 9/00825; G06K 9/00791; G08G 1/167; B60W 30/12;
(Continued)

(56) References Cited

U.S. PATENT DOCUMENTS

| 2004/0234124 A1* | 11/2004 | Nakai ..................... G06T 7/002 382/154 |
| 2006/0028560 A1* | 2/2006 | Konda ................... H04N 5/243 348/234 |

(Continued)

FOREIGN PATENT DOCUMENTS

| JP | 2004-096488 A | 3/2004 |
| JP | 2010-193180 A | 9/2010 |

(Continued)

OTHER PUBLICATIONS

Lin, Huei-Yung, and Wei-Zhe Chang. "High dynamic range imaging for stereoscopic scene representation." Image Processing (ICIP), 2009 16th IEEE International Conference on. IEEE, 2009.*
Sakoe, Hiroaki, and Seibi Chiba. "Dynamic programming algorithm optimization for spoken word recognition." Acoustics, Speech and Signal Processing, IEEE Transactions on 26.1 (1978): 43-49.*

*Primary Examiner* — Nathnael Aynalem
(74) *Attorney, Agent, or Firm* — McDermott Will & Emery LLP

(57) ABSTRACT

A stereo image processing apparatus includes an image acquirer acquiring images captured by a stereo camera including cameras having recognition ranges of their dynamic ranges differently set, and a mapper mapping the images with reference to the determined mapping areas of the images determined from the features extracted from the images. The stereo image processing apparatus further includes tracker tracking linear components from the mapping images by the mapper to determine a reference line segment, and a stereo image processor creating a stereo image for the images based on the determined reference line segments determined on the mapping areas.

8 Claims, 6 Drawing Sheets

(52) U.S. Cl.
CPC ............... *H04N 13/0239* (2013.01); *G06T 2207/10021* (2013.01); *G06T 2207/20076* (2013.01)

(58) Field of Classification Search
CPC ............. B60W 30/14; B60W 2420/42; B60W 40/072; B60W 2550/143; B60W 2550/146; B60T 2201/08; G06T 2207/30256; G06T 7/0075; G06T 2207/10012; G06T 7/002; G06T 2207/10021; H04N 13/0025; H04N 13/0239; H04N 13/025; H04N 13/0007; H04N 13/0029; H04N 13/0289; H04N 2013/0088; H04N 5/23232; H04N 5/2353; H04N 5/2355; H04N 5/35536
USPC ................... 348/43, 47, 48, 50, 52; 382/154
See application file for complete search history.

(56) References Cited

U.S. PATENT DOCUMENTS

| | | | |
|---|---|---|---|
| 2008/0095408 A1* | 4/2008 | Yokohata | H04N 5/144 382/106 |
| 2012/0050474 A1* | 3/2012 | Segall | G06T 5/50 348/43 |
| 2012/0162366 A1* | 6/2012 | Ninan | H04N 5/2355 348/43 |

FOREIGN PATENT DOCUMENTS

| | | |
|---|---|---|
| KR | 10-2006-0108878 A | 10/2006 |
| KR | 10-2010-0085539 A | 7/2010 |
| KR | 10-2010-0134288 A | 12/2010 |
| KR | 10-2012-0000373 A | 1/2012 |

* cited by examiner

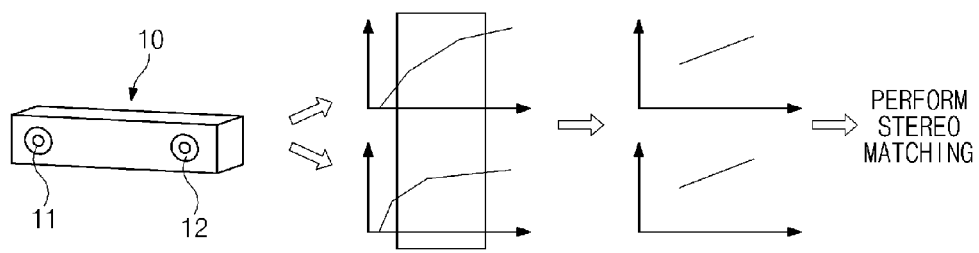

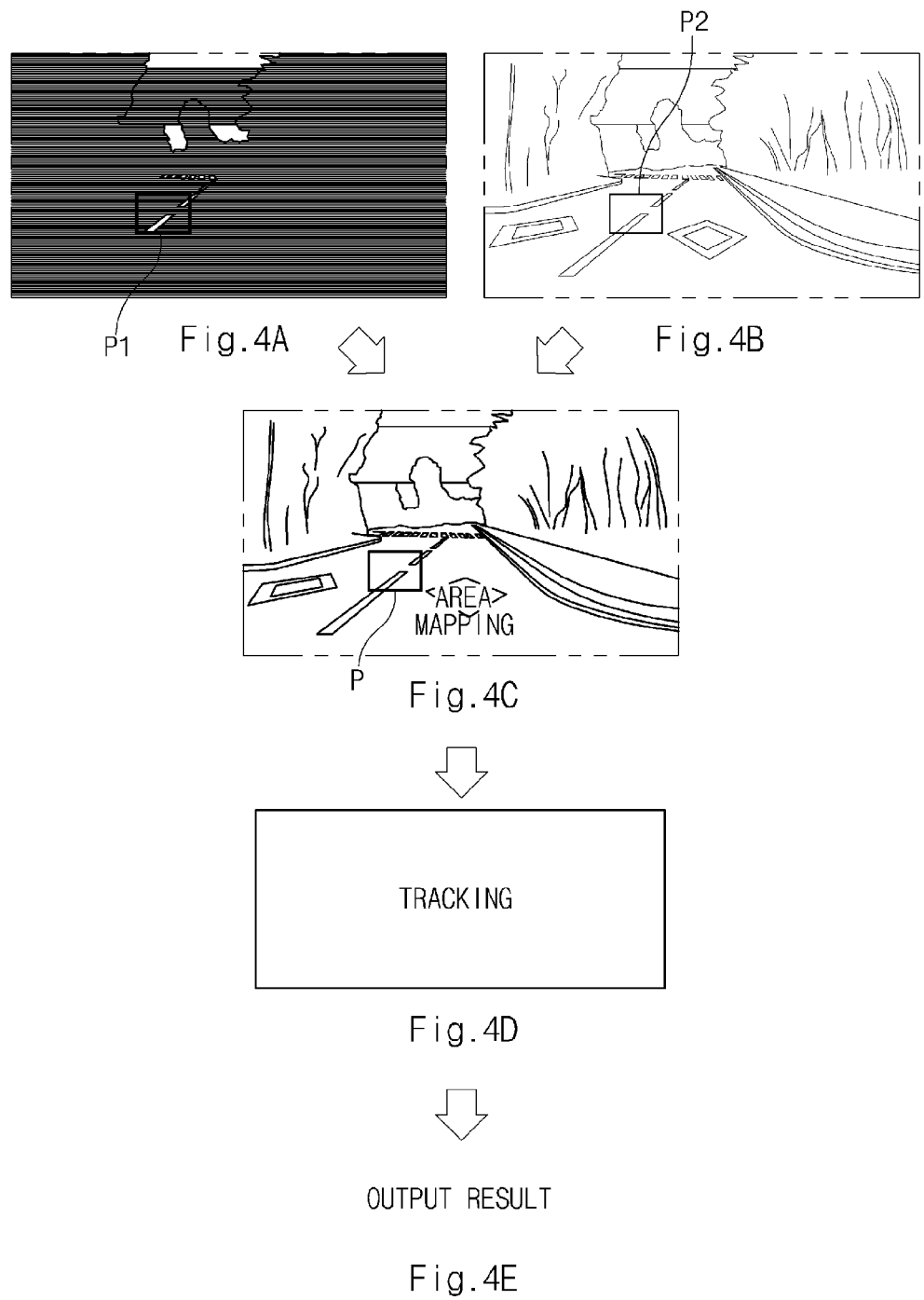

STEREO IMAGE PROCESSING APPARATUS AND METHOD THEREOF

CROSS-REFERENCE TO RELATED APPLICATION

This application is based on and claims priority from Korean Patent Application No. 10-2013-0029181, filed on Mar. 19, 2013 in the Korean Intellectual Property Office, the disclosure of which is incorporated herein in its entirety by reference.

TECHNICAL FIELD

The present disclosure relates to a stereo image processing apparatus and a method thereof, and more particularly, to a technique to process images from multiple cameras having different dynamic range settings.

BACKGROUND

In general, a stereo camera includes at least one more cameras than an existing monocular camera to capture stereoscopic images obtained by, such as radar.

However, frame limit of a monocular camera including a stereo matching in an existing stereo camera is 60 fps. Further a stereo camera sets exposure suitable for each of algorithms by exposure control in four steps. In this case, the frame rate for each algorithm is only 15 fps, such that when control is made by tracking, the frame rate is low and thus a tracking step becomes low. Accordingly, rate of misrecognition is increased.

SUMMARY

Accordingly, an embodiment of the present invention has been made to solve the above-mentioned problems occurring in the prior art while advantages achieved by the prior art are maintained intact.

One subject to be achieved by the present disclosure is to provide a stereo image processing apparatus and a method thereof in which dynamic ranges of cameras are differently set to provide images with improved visibility.

Another subject to be achieved by the present disclosure is to provide a stereo image processing apparatus and a method thereof in which log scales of mapping areas are minimized through a High Dynamic Range (HDR) graph conversion of images captured by cameras with different dynamic ranges.

In one aspect of the present disclosure, a stereo image processing apparatus is described, including: an image acquirer acquiring images captured by a stereo camera including cameras with recognition boundaries of their dynamic ranges differently set; a mapper preprocessing the images to determine mapping areas of the images based on features of the images and mapping the images with reference to the determined mapping areas of the images; a tracker tracking linear components from the mapping images by the mapper to determine a reference line segment; and a stereo image processor creating a stereo image for the images based on the determined reference line segments determined on the mapping areas.

The mapper may perform a stereo matching with reference to edge areas of the images or calculate a preset log scale, to determine the mapping areas of the images based on the result.

The apparatus may further include a dynamic range adjuster adjusting the recognition ranges of dynamic ranges for the cameras included in the stereo camera.

The stereo camera may include: a first camera having the recognition range of its dynamic range set to a range emphasizing a dark area, and a second camera having the recognition range of its dynamic range set to a range emphasizing a bright area.

The recognition ranges of the dynamic ranges of the first and second cameras may be set variably.

The mapper may perform a linear conversion on a particular area on the dynamic range graph for each image to match.

The mapper may determine a linear section common in the dynamic range graph for each image as a mapping area.

The tracker may calculate an average gradient of the line segments detected from mapping areas for the images to determine the average gradient as a reference line segment.

An aspect of the present disclosure provides a stereo image processing method, including: acquiring images captured by a stereo camera including cameras having recognition boundaries of their dynamic ranges differently set; preprocessing the images to determine mapping areas of the images based on features of the images and mapping the images with reference to the determined mapping areas of the images; tracking linear components from the mapping images by the mapper to determine a reference line segment; and creating a stereo image for the images based on the determined reference line segments determined on the mapping areas.

The method may further include adjusting the recognition ranges of dynamic ranges for the cameras included in the stereo camera.

The determining of the mapping areas may include performing a stereo matching with reference to edge of the images or calculate a preset log scale to determine the mapping areas of the images based on the result.

Mapping the images may include performing a linear conversion on a particular area on the dynamic range graph for each image to match.

Mapping the images may include determining a common linear section in the dynamic range graph for each image as a mapping area.

Determining the reference line segment may include calculating an average gradient of the line segments detected from mapping areas of the images to determine the average gradient as the reference line segment.

BRIEF DESCRIPTION OF THE DRAWINGS

The above and other objects, features and advantages of the present disclosure will be more apparent from the following detailed description taken in conjunction with the accompanying drawings, in which:

FIGS. 3A to 3D are views for illustrating an operation of graph conversion of a stereo image processing apparatus according to an embodiment of the present invention;

FIGS. 4A to 4E are views for illustrating an operation of stereo matching of a stereo image processing apparatus according to an embodiment of the present invention;

DETAILED DESCRIPTION

Hereinafter, embodiments of the present invention will be described with reference to the accompanying drawings.

Figure 1:
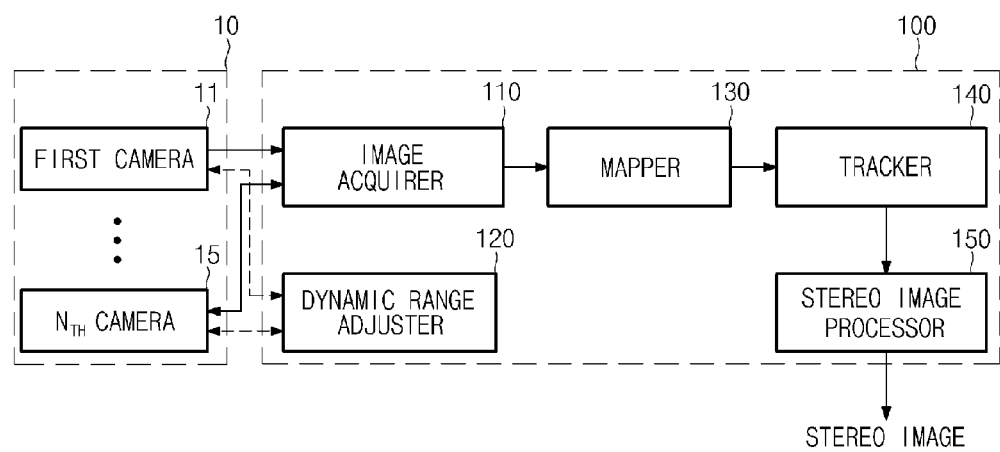
FIG. 1 is a block diagram illustrating a configuration of a stereo image processing apparatus according to an embodiment of the present invention.

FIG. 1 is a block diagram illustrating a configuration of a stereo image processing apparatus according to an embodiment of the present invention. In FIG. 1, the stereo image processing apparatus 100 according to an embodiment of the present invention (hereinafter referred to as "the image processing apparatus") is configured to include an image acquirer 110, a dynamic range adjuster 120, a mapper 130, a tracker 140 and a stereo image processor 150.

At first, the image acquirer 110 acquires images captured by a stereo camera 10.

Here, the stereo camera 10 includes a first camera 11 and a second camera 15. Although the stereo camera 10 may include more than two cameras, for the sake of convenience of description, in the following embodiments it is assumed that the stereo camera 10 includes two cameras.

The dynamic range adjuster 120 adjusts a recognition range of a dynamic range of each camera included in the stereo camera 10. Here, the dynamic range is a gradation viewable by the camera, which is a range of density steps between the brightest part and the darkest part. The dynamic range adjuster 120 adjusts a range emphasizing a dark area or a bright area for each camera. As an example, the dynamic range adjuster 120 may set the recognition range of the dynamic range of the first camera 11 to a range for emphasizing the dark area, while setting the recognition range of the dynamic range of the second camera 15 to a range for emphasizing the bright area. In some cases, the first camera 11 and the second camera 15 may set the recognition ranges of the dynamic range variable.

Accordingly, the image acquirer 110 acquires images captured by the stereo camera 10 having cameras with recognition ranges of their dynamic ranges differently set by the dynamic range adjuster 120.

The mapper 130 performs a stereo matching with reference to edge areas of the images acquired by the image acquirer 110. Here, the mapper 130 determines mapping areas of the images based on the matching results and maps the images with reference to the determined mapping areas of the images.

Here, the mapper 130 applies a linear conversion on a particular area on a dynamic range (DR) graph for each image to perform a stereo matching and determines a common linear section in the DR graph for the images as a mapping area.

The tracker 140 tracks a linear component on the mapping images by the mapper 130 to determine a reference line segment. Here, the tracker 140 calculates an average gradient of the line segments detected from the mapping images to determine it as a gradient of the reference line segment.

For example, the tracker 140 determines a median value between the gradient of the line segment detected from the first image acquired by the first camera 11 and the gradient of the line segment detected from the second image acquired by the second camera 15 as the gradient of the reference line segment.

The stereo image processor 150 calibrates, on the mapping image, differences in gradients of linear line segments of the images based on the gradient of the reference line segment determined by the tracker 140, to generate stereo images for the images.

Here, as an example, the stereo images generated by the stereo image processor 150 may be displayed via display means mounted on a vehicle, such as a navigation screen, a head up display (HUD) and a built-in monitor for automobile.

Figure 2A:
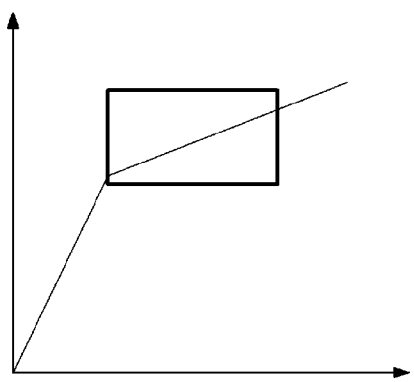
FIGS. 2A and 2B are views for illustrating an operation of setting a dynamic range of a stereo camera according to an embodiment of the present invention.
Figure 2B:
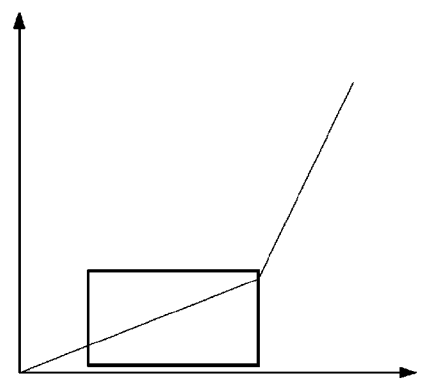

FIGS. 2A and 2B are views for illustrating an operation of setting a dynamic range of a stereo camera according to an embodiment of the present invention.

A recognition range of a dynamic range of a camera is set at density steps of the brightest part and the darkest part, and an image is captured with reference to the recognition range of the dynamic range set at the time of operating the camera.

Here, the image processing apparatus according to an embodiment of the present invention sets different recognition ranges of dynamic ranges for cameras included in a stereo camera.

As an example, the image processing apparatus sets the recognition range of the dynamic range for the first camera to a range emphasizing a dark area as shown in FIG. 2A and sets the recognition range of the dynamic range for the second camera to a range emphasizing a bright area as shown in FIG. 2B.

For the stereo camera having more than two cameras, recognition ranges of dynamic ranges may be set by dividing the recognition range of the brightest range and the recognition range of the darkest range by the number of cameras. Here, setting of the recognition range of a dynamic range is not limited to a particular structure but may be variously applicable according to embodiments.

Here, the image processing apparatus generates a final stereo image using the image captured by the stereo camera including cameras having the recognition ranges of their dynamic ranges differently set.

Assuming that a gain of acquiring an image according to exposure control is M, and if the image processing apparatus differently sets recognition ranges of dynamic ranges of N cameras, a gain of M×N is obtained, thereby improving visibility of a stereo image as the gain value is increased.

FIGS. 3A, 3B, 3C, and 3D illustrate an operation of graph conversion of a stereo image processing apparatus according to an embodiment of the present invention. Referring to FIG. 3, a stereo camera includes a first camera and a second camera as shown in FIG. 3A. Here, both the first and second cameras have different recognition ranges of dynamic ranges set.

When images captured by the first and second cameras are acquired, particular areas on DR graphs are limited as shown in FIG. 3B, and graphs are converted into those as shown in FIG. 3C. Here, a linear conversion is performed on the DR graphs within the particular area of FIG. 3B to produce graphs shown in FIG. 3C. Accordingly, the image processing apparatus performs a stereo matching as shown in FIG. 4D within limited areas in which the linear conversion was performed on the DR graphs.

For the limited areas shown in FIGS. 3B and 3C, a log scale is minimized to perform the stereo matching to make the linear conversion simple.

FIGS. 4A, 4B, 4C, 4D, and 4E illustrate an operation of stereo matching of a stereo image processing apparatus according to an embodiment of the present invention.

FIG. 4A represents a first image acquired by a first camera having a recognition range of a dynamic range set to a range emphasizing a dark area as shown in FIG. 2A, and FIG. 4B represents a second image acquired by a second camera having a recognition range of a dynamic range set to a range for emphasizing a bright area as shown in FIG. 2B.

The image processing apparatus according to an embodiment of the present invention performs a stereo matching with reference to edge areas of the first image shown in FIG. 4A and edge areas of the second image shown in FIG. 4B to determine a mapping area. If an area P1 in FIG. 4A is determined as a mapping area of the first image and an area P2 in FIG. 4B is determined as a mapping area of the second image, the first and second images are mapped by mapping the area P1 of the first image and the area P2 of the second image as shown in FIG. 4C. Finally, an area P on the mapping image shown in FIG. 4C becomes the mapping area.

When the first and second images are mapped as shown in FIG. 4C, the image processing apparatus performs a tracking on the mapping image as shown in FIG. 4D. Here, the image processing apparatus performs the tracking by combining information from the first image with information from the second image. Further, the image processing apparatus may evaluate reliability in consideration of transmission condition of the first and second images to reflect in the tacking.

Levels of reliability according to the transmission conditions of the first and second images are indicated in Table 1 below.

TABLE 1

| Level of reliability | Condition |
| --- | --- |
| 3 | Transmit both the first and second images |
| 2 | Transmit only in exposure in accordance with algorithm |
| 1 | Transmit only in exposure not in accordance with algorithm |
| 0 | No transmission information |

The image processing apparatus checks the reliability levels according to the conditions of the first and second images as described in Table 1, and determines a range to perform the tracking based on the ascertained reliability levels. Here, the image processing apparatus performs the tracking within the determined range. An operation of performing the tacking in the image processing apparatus will be described in detail with reference to FIG. 5.

Figures 5A, 5B:
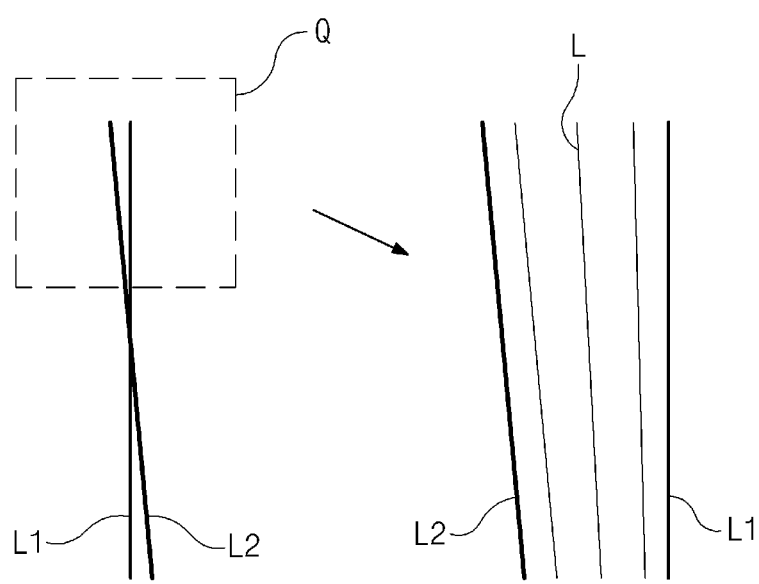
FIG. 5A and 5B are views for illustrating an operation of tracking of a stereo image processing apparatus according to an embodiment of the present invention.

FIGS. 5A and 5B illustrate an operation of tracking of a stereo image processing apparatus according to an embodiment of the present invention.

As shown in FIG. 5A, in mapping images of first and second images, if the tracking range for a traffic lane L1 on the first image and a traffic lane L2 on the second image are determined as an area Q, a reference line segment is determined based on line segment information included in the area Q as shown in FIG. 5B to generate a final stereo image based thereon.

An operation flow of the stereo image processing apparatus according to the embodiment of the present invention configured will be described below in detail.

Figure 6:
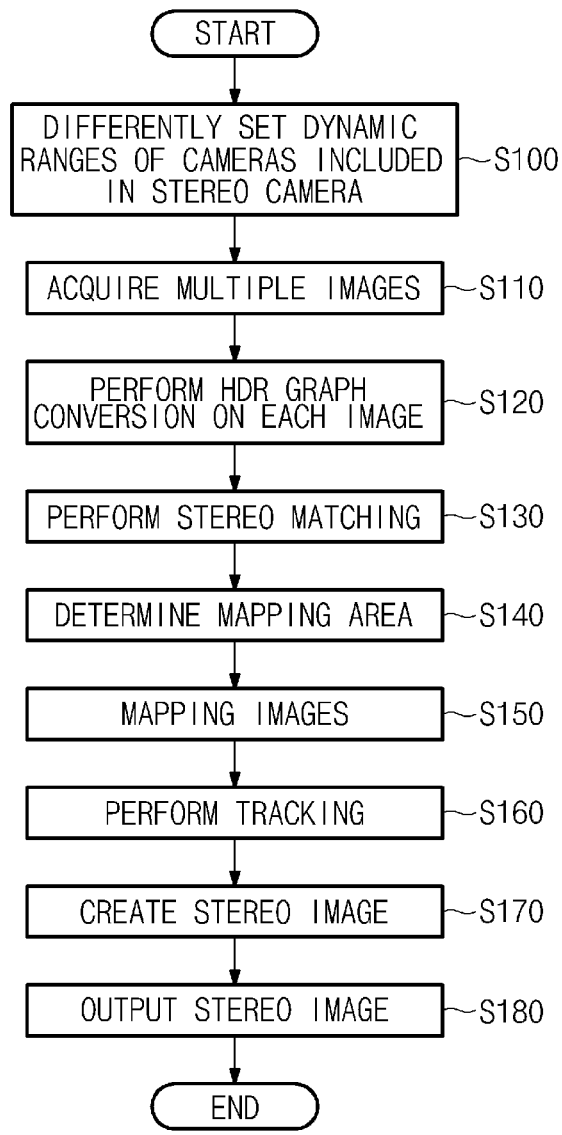
FIG. 6 is a flow chart showing an operation flow of a stereo image processing method according to an embodiment of the present invention.

FIG. 6 is a flow chart showing an operation flow of a stereo image processing method according to an embodiment of the present invention. Referring to FIG. 6, the image processing apparatus according to the embodiment of the present invention sets different recognition ranges of dynamic ranges for cameras included in a stereo camera (S100), and acquires multiple images captured by the cameras having dynamic ranges set in step S100 (S110).

Subsequently, the image processing apparatus performs a linear conversion on DR graphs of the images acquired in step S110 to obtain linear-logs (S120), and performs a stereo matching on the images which are linearly transformed in step S120 (S130). Here, the image processing apparatus determines mapping areas for the images based on the stereo matching result (S140), and maps the images with reference to the mapping areas determined in step S140 (S150).

Step S130 is optional and may be omitted in other embodiments. For example, if log scales have already been set for the images, no separate stereo matching needs to be performed, and, therefore, step S130 may be omitted.

Here, the image processing apparatus performs a tracking on linear components included in the mapping image generated in step S150 to create a stereo image with a reference segment having an average gradient among line segments in the images (S170), and displays the stereo image generated in step S170 via display means such as a HUD and a navigation (S180).

As stated above, according to embodiments of the present invention, by differently setting dynamic ranges of cameras included in a stereo camera, visibility of a stereo image can be improved.

Further, according to embodiments of the present invention, log scales of mapping areas are minimized through a HDR (High Dynamic Range) graph conversion of images captured by cameras with different dynamic ranges to minimize matching errors.

Although the stereo image processing apparatus and the method thereof according to the embodiments of the present invention have been described with reference to the accompanying drawings, the present disclosure is not limited to the embodiment and the accompanying drawings disclosed in the present specification, but may be modified without departing from the scope and spirit of the present disclosure.

What is claimed is:

1. A stereo image processing apparatus, comprising:
    an image acquirer acquiring images captured by a stereo camera including cameras having recognition ranges of their dynamic ranges differently set;
    a mapper preprocessing the images to determine mapping areas of the images based on features extracted from the images and mapping the images with reference to the determined mapping areas of the images;
    a tracker tracking linear components from the images mapped by the mapper to determine reference line segments; and
    a stereo image processor creating a stereo image for each of the images based on the reference line segments determined on the mapping areas,
    wherein the mapper performs linear conversion on a particular area on a dynamic range graph for each of the images to perform stereo matching for each of the images and uses a common linear section in dynamic range graphs of the images to determine the mapping areas,
    wherein the tracker calculates an average gradient of line segments detected from the images to determine a gradient of the reference line segments, and
    wherein the stereo image processor calibrates differences in gradients of linear line segments of the images with respect to the gradient of the reference line segment determined by the tracker to generate the stereo image.

2. The apparatus according to claim 1, wherein the mapper performs the stereo matching with reference to edge areas of the images or calculates a preset log scale, to determine the mapping areas of the images based on the calculation result.

3. The apparatus according to claim 1, further comprising a dynamic range adjuster adjusting the recognition ranges of the dynamic ranges for the cameras included in the stereo camera.

4. The apparatus according to claim 1, wherein the stereo camera including:
 a first camera having a first recognition range of its dynamic range set to a range emphasizing a dark area; and
 a second camera having a second recognition range of its dynamic range set to a range emphasizing a bright area.

5. The apparatus according to claim 4, wherein the recognition ranges of their dynamic ranges of the first and second cameras are set to be variable.

6. A stereo image processing method, comprising:
 acquiring images captured by a stereo camera including cameras having recognition ranges of their dynamic ranges differently set;
 determining mapping areas of the images based on features extracted from the images by preprocessing the images;
 mapping the images with reference to the determined mapping areas of the images;
 determining reference line segments by tracking linear components from the images mapped in the mapping; and
 creating a stereo image for each of the images based on the reference line segments determined on the mapping areas,
 wherein the mapping of the images includes performing linear conversion on a particular area on a dynamic range graph for each of the images to perform stereo matching for each of the images, and uses a common linear section in dynamic range graphs of the images to determine the mapping areas,
 wherein the determining of the reference line segments includes calculating an average gradient of line segments detected from the images to determine a gradient of the reference line segments, and
 wherein the creating of a stereo image for each of the images based on the reference line segments determined on the mapping areas calibrates differences in gradients of linear line segments of the images with respect to the gradient of the reference line segment to generate the stereo image.

7. The method according to claim 6, further comprising: adjusting the recognition ranges of the dynamic ranges for the cameras included in the stereo camera prior to the acquiring of the images.

8. The method according to claim 6, wherein the determining of the mapping areas includes performing the stereo matching with reference to edge areas of the images or calculating a preset log scale, to determine the mapping areas of the images based on the calculation result.

* * * * *